US007233856B2

(12) United States Patent
Yuya et al.

(10) Patent No.: US 7,233,856 B2
(45) Date of Patent: Jun. 19, 2007

(54) INTERNAL COMBUSTION ENGINE AND CONTROL METHOD THEREFOR

(75) Inventors: Masahiko Yuya, Kanagawa (JP); Naoki Osada, Kanagawa (JP); Yoshitaka Matsuki, Kanagawa (JP); Hidehiro Fujita, Kanagawa (JP); Atsushi Mitsuhori, Kanagawa (JP); Tadanori Yanai, Kanagawa (JP); Takatsugu Katayama, Kanagawa (JP); Shouta Hamane, Kanagawa (JP)

(73) Assignee: Nissaan Motor Co., Ltd., Kanagawa (JP)

( * ) Notice: Subject to any disclaimer, the term of this patent is extended or adjusted under 35 U.S.C. 154(b) by 36 days.

(21) Appl. No.: 11/318,723

(22) Filed: Dec. 27, 2005

(65) Prior Publication Data

US 2006/0142928 A1 Jun. 29, 2006

(30) Foreign Application Priority Data

Dec. 28, 2004 (JP) ............................ 2004-380655
Oct. 20, 2005 (JP) ............................ 2005-305588

(51) Int. Cl.
*G06F 19/00* (2006.01)
*F02N 17/00* (2006.01)

(52) U.S. Cl. .................................. 701/112; 123/179.5

(58) Field of Classification Search ................ 701/101, 701/112; 123/179.4, 179.5, 479
See application file for complete search history.

(56) References Cited

U.S. PATENT DOCUMENTS

| | | | | |
|---|---|---|---|---|
| 4,708,113 | A * | 11/1987 | Harada et al. | 123/406.3 |
| 5,715,794 | A * | 2/1998 | Nakamura et al. | 123/305 |
| 5,974,794 | A * | 11/1999 | Gotoh et al. | 60/286 |
| 6,691,675 | B2 * | 2/2004 | Kidokoro et al. | 123/329 |
| 2005/0166896 | A1 * | 8/2005 | Sadakane et al. | 123/431 |
| 2005/0229883 | A1 * | 10/2005 | Arai et al. | 123/90.16 |
| 2005/0245351 | A1 * | 11/2005 | Yamada et al. | 477/110 |
| 2006/0081207 | A1 * | 4/2006 | Nakamura | 123/179.3 |
| 2006/0144363 | A1 * | 7/2006 | Beer et al. | 123/305 |

FOREIGN PATENT DOCUMENTS

JP 2271073 11/1990

* cited by examiner

*Primary Examiner*—John T. Kwon
(74) *Attorney, Agent, or Firm*—Rader, Fishman & Grauer PLLC

(57) ABSTRACT

An internal combustion engine and control method therefor in which the engine is selectively started by combustion without cranking. The temperature in the combustion chamber of an engine cylinder is stabilized upon starting of the engine, thereby allowing secured staring without cranking. When predetermined idling stop conditions (or engine stop conditions) are established, the temperature in the combustion chamber is estimated based on engine operating conditions read before such establishment, and the period of maintaining a engine rotational speed in a predetermined low range before stopping the engine is calculated or estimated based on the estimated temperature in the combustion chamber. The engine is then stopped after the calculated or estimated period of maintaining the engine rotational speed in the predetermined low range.

15 Claims, 5 Drawing Sheets

INTERNAL COMBUSTION ENGINE AND CONTROL METHOD THEREFOR

RELATED APPLICATIONS

The disclosures of Japanese Patent Applications Nos. 2004-380655, filed Dec. 28, 2004, and 2005-305588, filed Oct. 20, 2005, including their specifications, claims and drawings, are incorporated herein by reference in their entireties.

FIELD

Described herein are an internal combustion engine and control method therefor in which the starting performance of the engine is improved, and more particularly, starting performance without cranking is improved.

BACKGROUND

Japanese Laid Open Patent Application No. H02-271073, filed Apr. 12, 1989, and published Nov. 6, 1990, relates to the starting of an internal combustion engine. Disclosed is a cylinder-direct injection-type engine in which, when the engine is not running, an engine cylinder is detected in which the piston is past upper dead center and has been stopped before the cylinder exhaust process has begun. The engine is started by igniting combustion in the detected cylinder by fuel injection without using a separate starting means (hereinafter simply referred to as the "starter") such as a cell motor or a recoil starter.

In the above-described engine, however, the temperature of the combustion chamber inside the cylinder at starting (ignition) is not taken into account. The vaporization rate of the injected fuel changes depending on the temperature of the combustion chamber, and therefore, in the above-described engine, the vapor mixing ratio in the combustion chamber differs depending on its internal temperature at starting.

SUMMARY OF THE INVENTION

The present internal combustion engine selectively begins rotation thereof by combustion upon ignition, and a pre-stopping operation is selectively performed by maintaining an engine rotational speed in a predetermined low range throughout a predetermined period prior to a stopping of the engine.

BRIEF DESCRIPTION OF THE DRAWINGS

These and other features and advantages of the present engine and method will be apparent from the following description, taken in conjunction with the accompanying drawings, in which.

DESCRIPTION OF THE ILLUSTRATED EMBODIMENT

Figure 1:
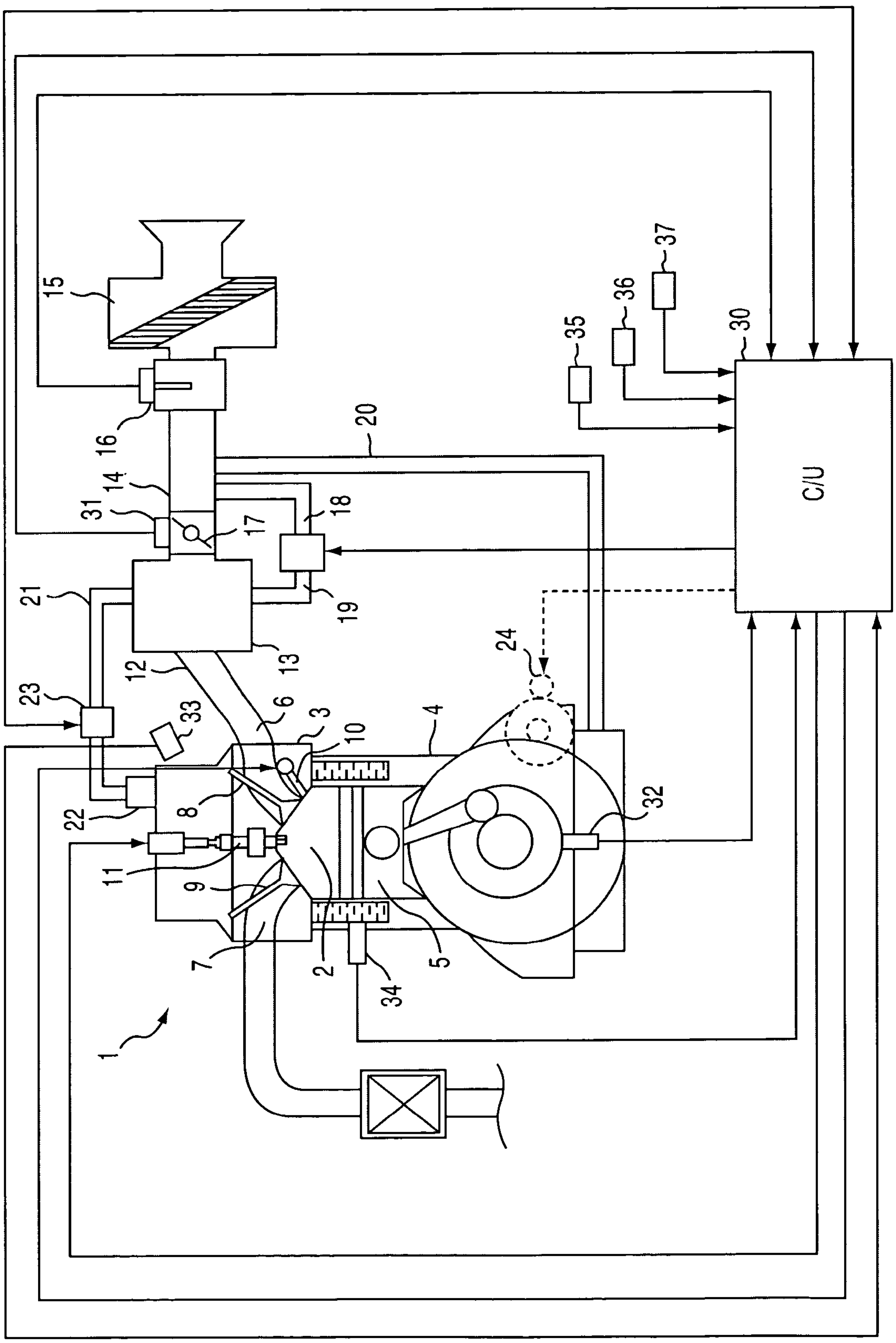
FIG. 1 is a schematic representation of a cylinder-direct injection-type internal combustion engine according to an embodiment thereof.

As shown in FIG. 1, a combustion chamber 2 of an engine 1 comprises a cylinder head 3, a cylinder block 4, and a piston 5 fitted inside a cylinder in the cylinder block 4. An inlet port 6 and an exhaust port 7 that open to the combustion chamber 2 are formed in the cylinder head 3. An inlet valve 8 and an exhaust valve 9 act to open and close these ports 6 and 7 and are driven by an inlet valve cam and an exhaust valve cam (neither shown). A variable valve mechanism (not shown) controls the timing of the opening and closing of the inlet valve 8. A variable valve mechanism may be provided for the exhaust valve 9 as well. Also provided on the cylinder head 3 and facing into the combustion chamber 3 are a fuel injection valve 10 for directly injecting fuel into the combustion chamber 2, and an ignition plug 11 for spark-igniting the fuel-air mixture inside the combustion chamber 2. An inlet manifold 12 is connected to the inlet port 6, and an inlet duct 14 is connected to the upstream side of the inlet manifold 12 via an inlet collector 13. An air cleaner 15 for removing dust and other particles from intake air, an air flowmeter 16 for detecting the volume rate of intake air, and a throttle valve 17 for controlling the amount of intake air are provided on the inlet duct 14 in that order from upstream of the intake air flow. A bypass 18 connects the inlet duct 14 from upstream of the throttle valve 17 with the inlet collector 13, thereby bypassing the throttle valve 17. The bypass 18 is provided with an idling controlling valve 19 for controlling the volume rate of air passing through the bypass 18.

A first blow-by path 20 connects the inlet duct 14 on the upstream side of the throttle valve 17 with the crank case in the cylinder block 4, and a second blow-by path 21 connects a rocker chamber in the head cover of the cylinder head 3 with the inlet collector 13. By means of these blow-by paths 20 and 21, the blow-by gas generated in the engine 1 is ventilated by the intake air introduced from the inlet duct 14 and then is led to the inlet collector 13. In the second blow-by path 21 are a pressure control valve (PCV valve) 22 for controlling the pressure of the blow-by gas and a blow-by control valve 23 for controlling the rate of blow-by gas flow.

Signals are received by a control unit (C/U) 30 from a variety of sensors, such as a throttle aperture sensor 31 for detecting the throttle aperture TVO, a crank angle sensor 32, a cam angle sensor 33, a coolant or water temperature sensor 34, a vehicle speed sensor 35, a gear position sensor 36 for detecting the position of the gear of the vehicle transmission, and a brake sensor 37 for detecting the on/off operation of the brake or brakes, etc., in addition to the air flowmeter 16.

Based on the signals received, the C/U 30 controls the variable valve mechanism, the fuel injection valve 10, the ignition plug 11, the throttle valve 17, the idling control valve 19, the blow-by control valve 23, etc. In addition, the C/U 30 detects the engine rotational speed Ne based on the detected signal of the crank angle sensor 32 and also can detect a cylinder at a specific process point based on the detected signal of the crank angle sensor 32 and the cam angle sensor 33.

Further, the C/U 30 executes an idling stop control, in which an idling stop automatically stops the engine 1, when predetermined idling stop conditions are established (for example, when the gear position of the transmission is within the D- or forward-drive range, the brake is on (engaged), and the vehicle speed is zero), and releases the idling stop and automatically starts the engine 1 when predetermined idling stop releasing conditions are established (for example the brake is released after the idling stop condition was established and the starting operation is executed by the driver).

The idling stop control executed by the C/U 30 is described as follows. First, the engine 1 according to the present embodiment is started from the stopped state (including restarting after an idling stop) by injecting fuel into the cylinder in the expansion phase of the combustion chamber 2 and igniting it, without using a starter (without cranking). When there are fluctuations in temperature in the combustion chamber 2, even if similar fuel injection is carried out in the same manner, the mixing rate in the combustion chamber at ignition also fluctuates and therefore, an appropriate fuel-air mixture is not available at ignition, thereby causing a flaming failure, and consequently starting may fail. Therefore, from the point of view of ensured starting without cranking, it is desirable to keep a constant temperature in the combustion chamber 2 at the time of starting.

Figure 2:
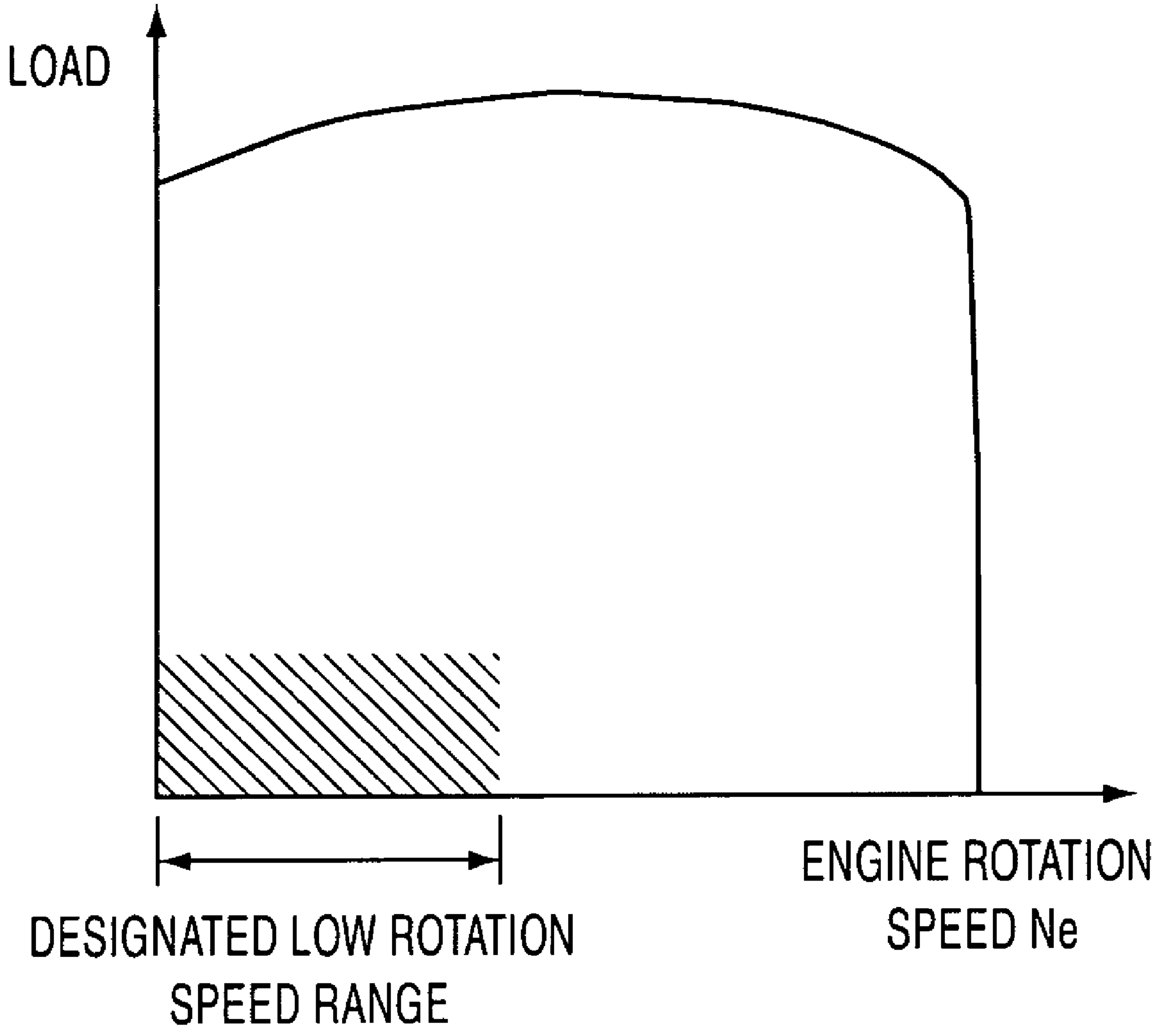
FIG. 2 is a graph showing an example of a pre-stopping operation range.

Consequently, in accordance with the present embodiment, control is effected so that the temperature inside the combustion chamber during an idling stop (engine stopping) becomes constant and is therefore approximately constant at restarting. As a result, the fuel-air mixture in the combustion chamber at the time of ignition is stabilized. More specifically, a "pre-stopping operation" is performed that maintains the engine rotational speed Ne within a predetermined low rotational speed range (for example, within the hatched area in FIG. 2) immediately before the idling stop (engine stopping), so that the temperature in the combustion chamber at engine stopping is established to be within the predetermined range up to that point (the temperature in the combustion chamber is stabilized), thereby allowing stabilization of the temperature in the combustion chamber at (re)starting, and thus the condition of the fuel-air mixture at the time of ignition becomes stable and appropriate.

In the following description, "idling before stopping" is employed as the "pre-stopping operation"; nonetheless, this is a mere example, and it goes without saying that as described above, the temperature in the combustion chamber can be stabilized without carrying out idling as long as the engine rotational speed Ne is maintained at the predetermined low range for a predetermined period of time.

Figure 3:
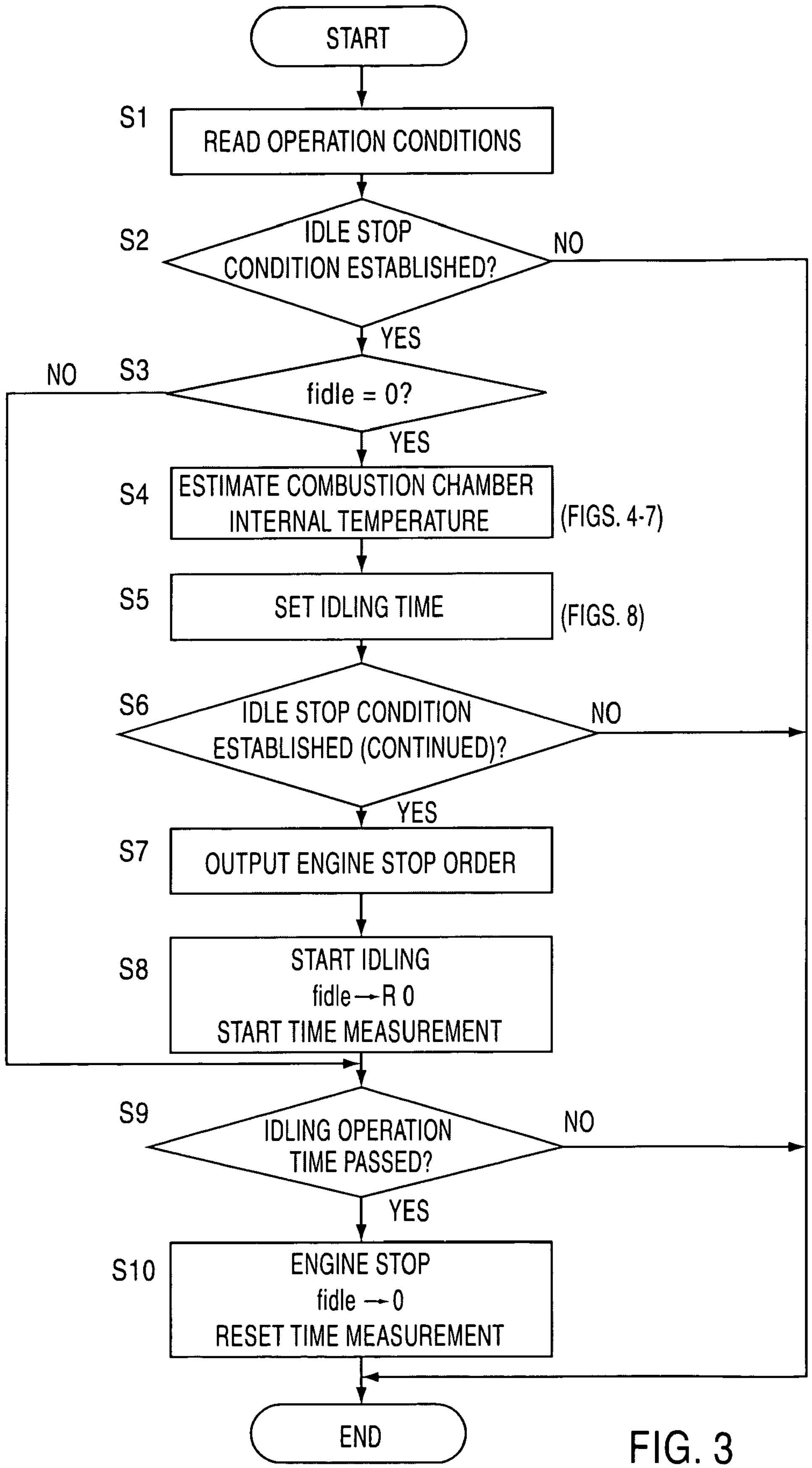
FIG. 3 is a flow chart showing control during an idling stop.

FIG. 3 is a flow chart that shows the control process during an idling stop, which is executed at each of the predetermined periods of time. At step S1, the engine operating conditions such as engine rotational speed Ne and throttle aperture TVO, etc., are read. At step S2, it is detected whether or not the idling stop conditions have been established. If the idling stop conditions have been established the process advances to step S2, and if they have not, the process is completed. As described above, the conditions for the idling stop in the present embodiment are: (1) the transmission gear position is within the D-range; (2) the vehicle speed is zero (or almost zero); and (3) the brake is on (engaged); nonetheless, the predetermine conditions are not limited to these.

At step S3, it is detected whether or not the idling-before-stopping flag f idle is 0. If f idle=0, the process advances to step S3, and if f idle=1, the process advances to step S9. This idling-before-stopping flag f idle is, as described below, configured when a command to stop the engine is generated upon establishment of the idling stop conditions (step S8).

Figure 4:
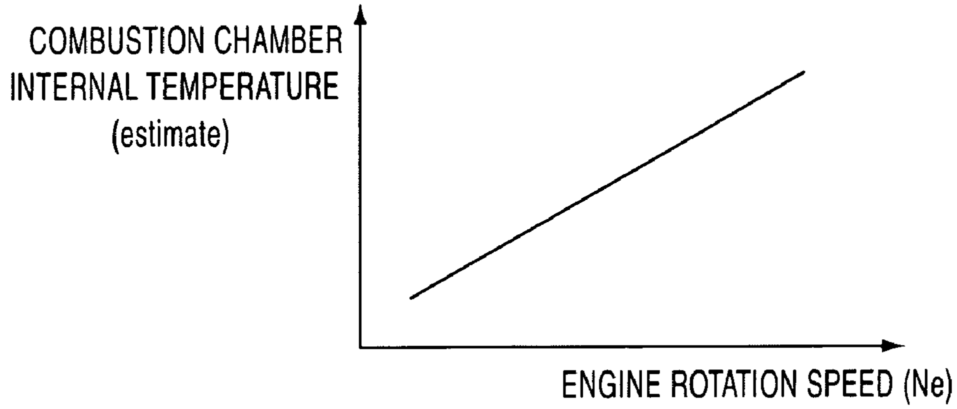
FIG. 4 is a graph representing a first estimation table for internal combustion chamber temperature.

At step S4, the temperature in the combustion chamber is estimated. The estimation is carried out based on one of the graphs or tables represented as examples in FIGS. 4, 5 and 6, as follows:

FIG. 4 represents an example of a table of engine rotational speed Ne vs. temperature in the combustion chamber. As shown in FIG. 4, the higher the engine rotational speed Ne, the higher the estimated temperature in the combustion chamber. This is because the higher the engine rotational speed Ne, the briefer the combustion interval becomes and therefore the calorific power per unit time is increased.

Figure 5:
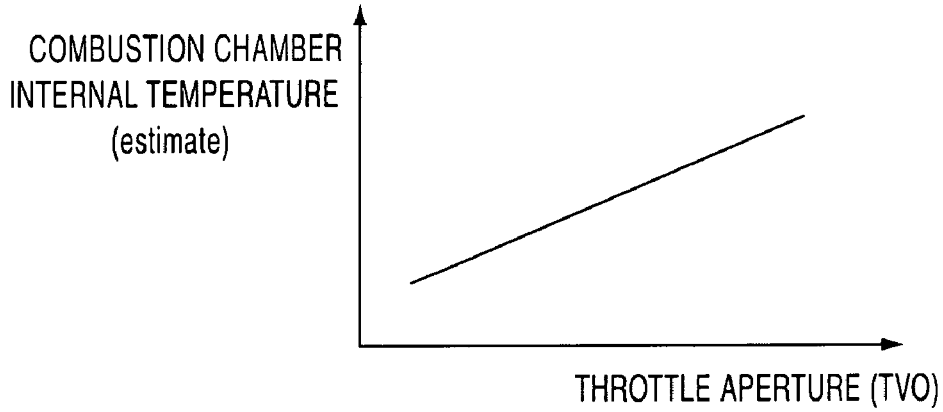
FIG. 5 is a graph representing a second estimation table for internal combustion chamber temperature.

FIG. 5 represents an example of a table of throttle aperture TVO vs. temperature in the combustion chamber. As shown in FIG. 5, the larger the throttle aperture TVO, the higher the estimated temperature in the combustion chamber. This is because the larger the throttle aperture TVO, the greater the quantity of air per single combustion, and therefore the calorific power is increased.

Figure 6:
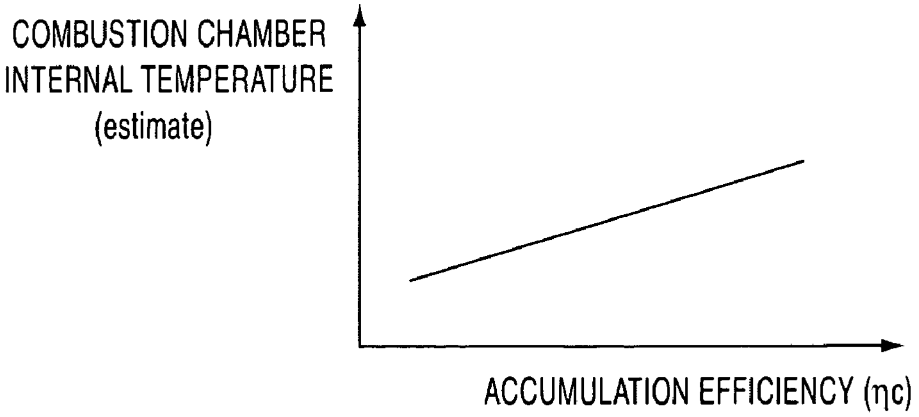
FIG. 6 is a graph representing a third estimation table for combustion chamber temperature.

FIG. 6, on the other hand, represents an example of a table of accumulation efficiency (sometimes called filling efficiency or volumetric efficiency) ηc vs. temperature in the combustion chamber. In this case too, as with the throttle aperture TVO, the higher the accumulation efficiency ηc, the more calorific power per single combustion and therefore, a higher temperature in the combustion chamber is estimated. In FIG. 6, the calculation of the accumulation efficiency ηc is required; nonetheless; the calculation is not so limited, and it is acceptable to estimate the temperature in the combustion chamber based on parameters that have an effect on the accumulation efficiency ηc. (In other words, the temperature in the combustion chamber is estimated as high when the parameters that affect the accumulation efficiency ηc indicate that it is high.) Examples of parameters that cause the accumulation efficiency ηc to be high are, the opening/closing timing of the inlet valve 8 and the exhaust valve 9, the wall (coolant or water) temperature in the combustion chamber 2, and the inlet temperature and inlet pressure of the intake air (in this case, a temperature sensor and pressure sensor should be provided for this purpose).

Figure 7:
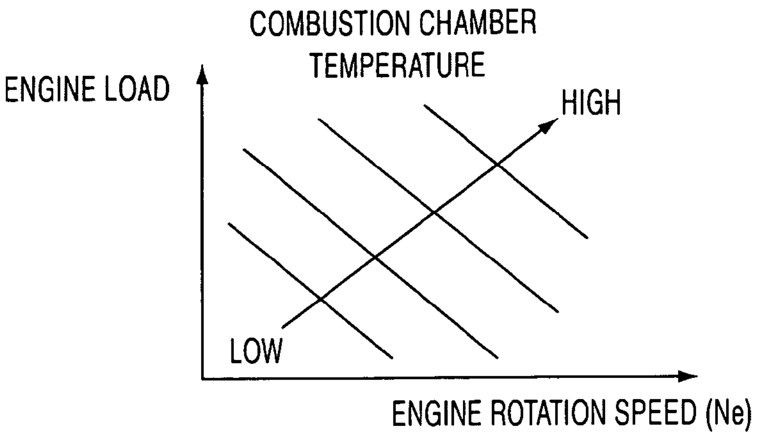
FIG. 7 is a graph representing a fourth estimation table for combustion chamber temperature.

FIG. 7 is a graph representing an example of a chart for estimating the temperature in the combustion chamber based on the engine rotational speed, and it is equivalent to a combination of FIGS. 4 to 6. Several methods are shown, as above; nonetheless, the temperature in the combustion chamber can be estimated with other methods, and more simply, it is acceptable that the value detected by the water temperature sensor 34, etc., when the idle stop conditions are established, be used instead.

Now, returning to FIG. 3, at step S5 the period in which to perform idling before stopping is calculated or estimated (hereinafter simply referred to as the "idling time"). The calculation or estimation is based on, for example, the table of temperature in the combustion chamber vs. idling time" represented in FIG. 8. The higher the (estimated) temperature in the combustion chamber, the longer the idling time is calculated or estimated. This is because, as shown in FIG. 9, the temperature-decreasing property is different depending on the temperature in the combustion chamber, and therefore, the idling times (t1, t2, and t3) required to maintain the temperature in the combustion chamber constant upon stopping the engine are different. The idling time could be established by taking into account the maximum imaginable combustion chamber temperature (in this case, the idling time would always the same); however, by doing so, idling longer than necessary would be required, and therefore it would not desirable to do so because gas mileage would be reduced as a result of the idling stop. Therefore, based on the present embodiment, the idling time is established based on the temperature in the combustion chamber, thereby allowing a constant temperature for the combustion chamber (reduced to the predetermined temperature) upon stopping the engine with the minimally required idling.

At step S6, it is detected whether or not the established idling stop conditions are continuing. If they are continuing, the process advances to step S7 or when they are no longer continuing, the process is terminated. At step S7, the engine stop command is generated. By doing so, the engine stopping procedure is commenced (moved on to engine stopping control). At step S8, the idling-before-stopping flag, f idle is set at 1, and idling is commenced. At the same time, measurement of the elapsed time by the timer is begun. As described above, a "pre-stopping operation" that maintains the engine rotational speed in the predetermined low range can be used instead of "idling before stopping" that effects idling.

At step S9, it is detected whether or not the idling time established in step S5 has elapsed. If it has elapsed, the process advances to step S10, and if it has not, the process is terminated. At step S10, idling is terminated because the calculated or estimated idling time has elapsed, and the engine is stopped (idling stop is executed). In addition, the idling-before-stopping flag, f idle is released (set at 0), and at the same time, the timer is reset.

As described above, the cylinder-direct injection-type internal combustion engine according to the present embodiment does not stop the engine immediately after the idling stop conditions are established, but rather, the engine is stopped after idling before stopping (pre-stopping operation), for a period of time calculated or estimated in accordance with the temperature in the combustion chamber (it is estimated based on the engine operating conditions immediately prior) when the idling stop conditions are established. By doing so, regardless of the operating conditions prior to the idling stop (control), the temperature(s) in the respective each combustion chamber(s) during the idling stop (engine stop) can be maintained approximately constant, thereby allowing the temperature(s) in the respective each combustion chamber(s) at a subsequent restart to be approximately constant as well. Consequently, the fuel-air mixture is stabilized in the combustion chamber upon ignition by the injected fuel, allowing an ensured ignition, and therefore starting performance without cranking can be improved. The predetermined low range of rotational speed can be between 600 rpm-800 rpm during substantially no load (which is caused because vehicle is driven). The predetermined period can be between 5 sec-20 sec, when the rotational speed is 650 rpm. The 5 sec period can be adopted when the operating condition prior to the idling stop is low load condition, for example 40 km/h Road Load (constant velocity running on the flat road). The 20 sec period can be adopted when the operating condition prior to the idling stop is high load condition, for example 3600 rpm-WOT (Wide Open Throttle).

According to the above-mentioned embodiment, the predetermined period of idling before stopping is imposed immediately prior to the idling stop (stopping of the engine) and therefore the temperature in the combustion chamber prior to the engine stop can be stabilized. Consequently, regardless of the operating conditions prior to the engine stop or the length of the stopping time, the temperature in the combustion chamber is stabilized, so that starting performance without cranking can be improved. Here, as described above, not only idling before stopping but also a pre-stopping operation (not idling) can be employed that maintains engine rotational speed at the predetermined low rotational speed range.

Figure 8:
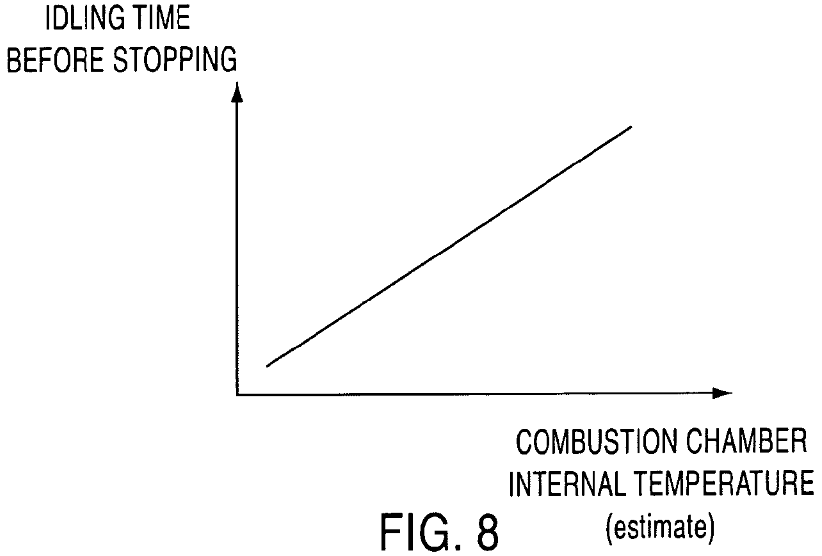
FIG. 8 is a graph representing an example of a table for establishing idling time.
Figure 9:
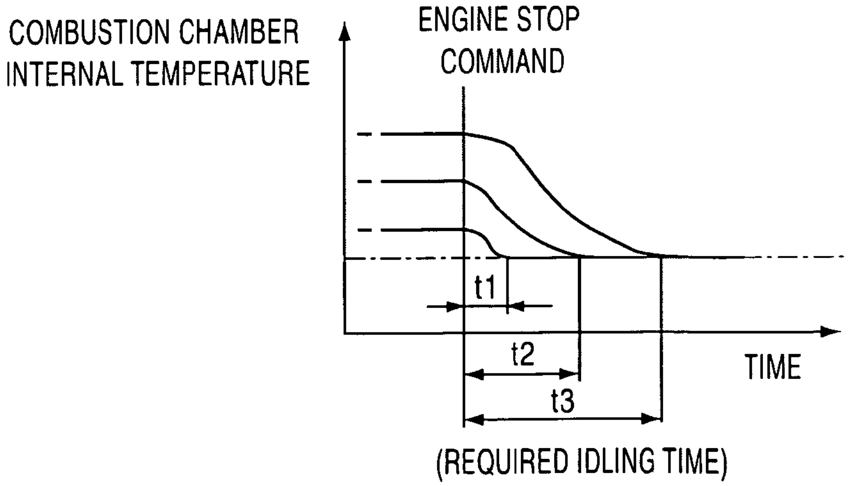
FIG. 9 is a chart representing required idling times.

In addition, when the engine stop conditions are established (namely when stopping of the engine is determined), the idling time is calculated or estimated based on the temperature in the combustion chamber, and the higher the temperature in the combustion chamber the longer the idling time is calculated or estimated (see FIG. 8). By doing so, both reduction of the idling time and an improvement in starting performance can be achieved. The temperature in the combustion chamber is estimated based on the engine operating conditions immediately prior to the establishment of the engine stop conditions (engine load and engine rotational speed Ne, throttle aperture TVO, accumulation efficiency ηc) (see FIGS. 4 to 8) and therefore, there is no need to provide a dedicated temperature sensor and precision estimation is realized with a relatively simple structure.

The flowchart of FIG. 3 shows control at the idling stop; nonetheless, this process can be applied to a normal engine stop. In this case, the flowchart shown in FIG. 3 can be modified as follows. Simply speaking, first, at step S1, from the idling conditions (1) to (3), it is detected whether or not (2) the vehicle speed is zero (approximately zero) and (3) the brake is engaged. Then, the engine stop command is generated when the ignition (switch) is turned off at step S6. Next, the time elapsed until the ignition has been turned off is measured, and the measured time is subtracted from the calculated or estimated idling time, and then during a period based on the results, idling is carried out after the ignition is turned off, and then the engine is stopped. (When the result is 0 or less, the engine is immediately stopped when the ignition is turned off.) By doing so, starting (igniting) without cranking can be securely carried out even with normal starting. For example, even if the engine is turned off after a long drive and then started immediately after that, the temperature in the combustion chamber is reduced to approximately a predetermined temperature, thereby allowing for a constantly stable fuel-air mixture condition in the combustion chamber at ignition, and consequently, a flaming failure can be prevented.

In addition, it is acceptable to provide a starting (supporting) means such as a starter motor 24 that initiates rotation of the crank axle (shown as a dotted line in FIG. 1), and starting (or supporting thereof) using the starter motor 24 can be carried out. Furthermore, the embodiment has been shown and described as a cylinder-direct injection-type internal combustion engine; nonetheless, it is not so limited, and it is acceptable to employ a structure in which fuel remains in the cylinder as in ordinary internal combustion engines.

Thus, while the engine and method have been described in connection with certain specific embodiments thereof, this is by way of illustration and not of limitation, and the appended claims should be construed as broadly as the prior art will permit.

What is claimed is:

1. An internal combustion engine that selectively starts an engine rotation thereof by combustion upon ignition, comprising:

a fuel injector for injecting fuel into a combustion chamber to produce an air-fuel mixture in the combustion chamber, an ignition plug for igniting the air-fuel mixture to effect combustion in the combustion chamber, and a controller for controlling combustion to provide torque for starting the engine rotation from stopped state, wherein a pre-stopping operation is selectively performed by maintaining an engine rotational speed in a predetermined low range throughout a predetermined period prior to a stopping of the engine.

2. An internal combustion engine according to claim 1, wherein the pre-stopping operation comprises idling the engine.

3. An internal combustion engine according to claim 1, wherein the stopping of the engine is an idling stop in which the ignition remains turned on.

4. An internal combustion engine according to claim 1, wherein the period is predetermined according to a temperature in a combustion chamber of an engine cylinder when predetermined engine stopping conditions are established.

5. An internal combustion engine according to claim 4, wherein the higher the temperature in the combustion chamber, the longer the maintaining the engine rotational speed in the predetermined low range is carried out.

6. An internal combustion engine according to claim 4, wherein the temperature in the combustion chamber is estimated based on engine operating conditions prior to the establishment of the predetermined engine stopping conditions.

7. An internal combustion engine according to claim 6, wherein the engine operating conditions include the engine rotational speed.

8. An internal combustion engine according to claim 6, wherein the engine operating conditions include a throttle aperture.

9. An internal combustion engine according to claim 6, wherein the engine operating conditions include parameters that affect the accumulation efficiency.

10. An internal combustion engine according to claim 4, wherein the engine operating conditions include an engagement of the brake and a vehicle speed of approximately zero.

11. An internal combustion engine comprising:

a fuel injector for injecting fuel into a combustion chamber to produce an air-fuel mixture in the combustion chamber, an ignition plug for igniting the air-fuel mixture to effect combustion in the combustion chamber, a controller for controlling combustion to provide torque for starting the engine rotation from stopped state, combustion start means for selectively starting the engine by combustion in an engine cylinder from a stopped state, and pre-stopping operation means for maintaining a engine rotational speed in a low range prior to a stopping of the engine.

12. A control method for an internal combustion engine selectively started by combustion in an engine cylinder, wherein a pre-stopping operation is carried out in order to maintain engine rotational speed in a low range prior to a stopping of the engine.

13. A control method for an internal combustion engine according to claim 12, wherein the pre-stopping operation is an idling of the engine.

14. A control method for an internal combustion engine according to claim 12, wherein the stopping of the engine is an idling stop in which an ignition remains turned on, and the pre-stopping operation is carried out for a period of time predetermined according to a temperature in a combustion chamber when predetermined engine stopping conditions are established.

15. A control method for an internal combustion engine according to claim 14, wherein the temperature in a combustion chamber is estimated based on engine operating conditions prior to the establishment of the predetermined engine stopping conditions.

* * * * *

UNITED STATES PATENT AND TRADEMARK OFFICE

CERTIFICATE OF CORRECTION

PATENT NO. : 7,233,856 B2
APPLICATION NO. : 11/318723
DATED : June 19, 2007
INVENTOR(S) : Masahiko Yuya It is certified that error appears in the above-identified patent and that said Letters Patent is hereby corrected as shown below:

On the Title Page

Item (73), Please change “Nissaan” to --Nissan--.

Signed and Sealed this

Twenty-eighth Day of August, 2007

JON W. DUDAS

*Director of the United States Patent and Trademark Office*